J. C. Stoddard.
Horse Rake.

No. 2019
33023

Patented Aug. 6, 1861.

Witnesses.

Inventor.
J. C. Stoddard
Munn & Co
Attorneys

UNITED STATES PATENT OFFICE.

J. C. STODDARD, OF WORCESTER, MASSACHUSETTS, ASSIGNOR TO HIMSELF AND W. A. HACKER, OF SAME PLACE.

IMPROVEMENT IN HORSE HAY-RAKES.

Specification forming part of Letters Patent No. 33,023, dated August 6, 1861.

*To all whom it may concern:*

Be it known that I, J. C. STODDARD, of Worcester, in the county of Worcester and State of Massachusetts, have invented certain new and useful Improvements in Operating Horse Hay-Rakes; and I do hereby declare that the following is a full, clear, and exact description thereof, reference being had to the accompanying drawings, making a part of this specification, in which—

Figure 1:
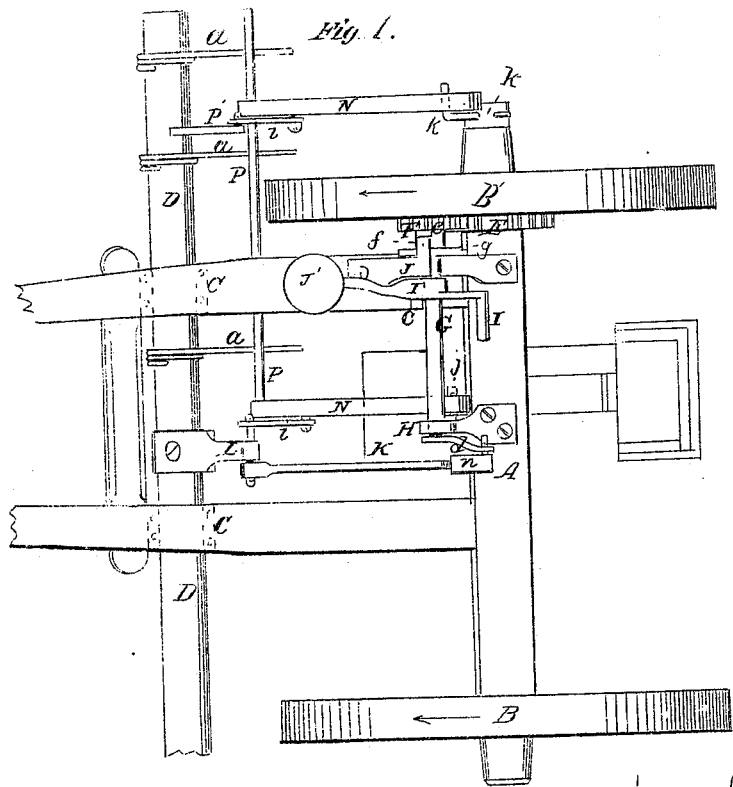
Figure 2:
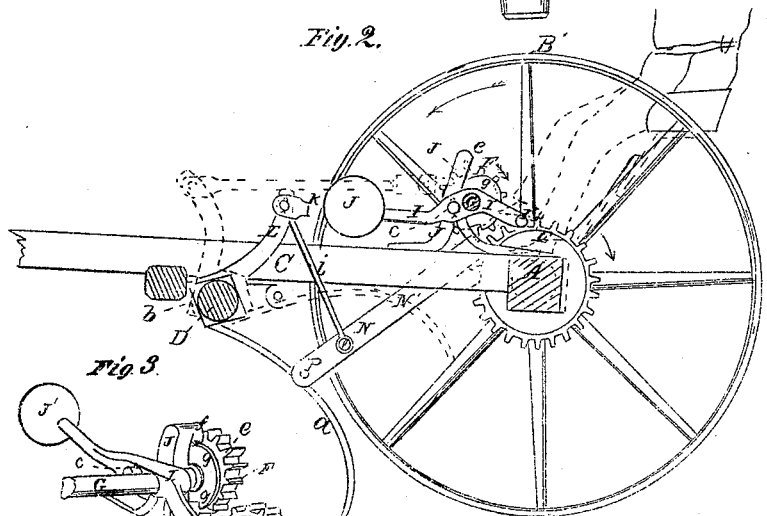
Figure 3:
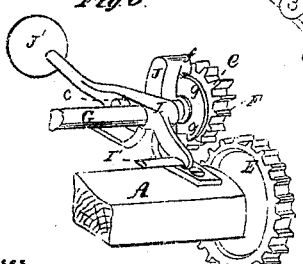

Figure 1 is a top view of the improved horse hay-rake. Fig. 2 is a longitudinal section through Fig. 1 in the vertical plane indicated by the course of red line $x\,x$ thereon. Fig. 3 is a detached perspective view of a portion of the rake-elevating mechanism.

Similar letters of reference indicate corresponding parts in the three figures.

This invention relates to certain improvements in horse hay-raking machines wherein a swinging rake is used, the object of which improvements being to transfer to the horse drawing the machine the labor of holding the rake down while gathering its burden of grass and tilting it up to leave the same, at the same time to give the driver complete control over the rake either in the forward or backward movements of the machine.

It also has for its object a method of holding the rake-teeth down, and bracing them up to the work of raking the hay into cocks, when the machine is used for this purpose.

To enable those skilled in the art to make and use my invention, I will proceed to describe it construction and operation.

A represents the axle-tree of two carriage-wheels, B B', and C C represent the thills, which are secured to the axle-tree A near the wheel B', as shown in Fig. 1 of the accompanying drawings.

D represents the rake head or bar, to which the rake-teeth $a\,a\,a\,a$ are suitably attached. The bar D extends tranversely across the machine in front of the wheels B B', and this bar D hangs under the thills C C in bearings $b\,b$, in which the bar is allowed to rock freely. By thus having the rake in front of the wheels B B' the grass is gathered before these wheels press it down, which is particularly desirable when the grass is wet. Besides, the driver can see whether the grass is being raked clean without looking back. The carriage wheel B' has a large spur-wheel, E, keyed to its hub inside of the wheel. This spur-wheel E operates upon the rake, to raise or depress the rake-teeth, through the medium of the following mechanism:

F represents a pinion spur-wheel, which is keyed to one end of a short transverse shaft, G, which has its end bearings in a bracket, H, and in the short arm of a loaded lever, I. The pinion spur-wheel F hangs in front of the spur-wheel E, and in such a relation to this wheel E that by depressing the shaft G the teeth of the two spur-wheels E and F will engage with each other. The lever I has its fulcrum-bearing on a pin, $c$, which projects out from the standard J, and the long arm of this lever carries on its end a weight, J', which is sufficiently heavy to raise the pinion-carrying end of shaft G and disengage the pinion F from spur-wheel E, when the short arm of the lever I is released. This short arm of lever I is curved downward, and it has a suitable foot-piece, I', formed on it, whereby this short arm may be depressed at pleasure by a touch of the foot. On the end of shaft G which projects from the bracket H is keyed a short crank-arm, $d$, to the end of which is pivoted a pitman, K. This pitman proceeds forward of shaft G, and is pivoted at its forward end to an arm, L, which is suitably secured to and projects up from the rake-bar D, as shown in Figs. 1 and 2 of the drawings.

Now, when the short arm (or treadle-arm) of loaded lever I is depressed, and the pinion-wheel F thus brought into gear with spur-wheel E, on the hub of carriage-wheel B, by rotating this latter wheel a vibrating movement will be communicated to the rake-bar D. The arm L on rake-head D is of such a length and is so arranged with relation to the movement of crank-arm $d$ on rotating shaft G that the rake will receive the movement shown in Fig. 2 of the drawings, which is sufficient to bring the rake into a working position and to throw it up again out of the way of the hay.

The pinion-wheel F is arranged in such a relation to its driving-wheel E that when these two wheels are engaged with each other and the latter rotated in the direction indicated by the arrow in Fig. 2 the pinion F will be held in gear with wheel E without keeping the short arm of lever I depressed; but it is not desired that the pinion F should be thus kept down on wheel E longer than to allow the pinion F to make a half-revolution, and therefore the two teeth e e of wheel F are made longer than the others, so that these teeth will throw the wheel F out of gear with wheel E at every half-revolution of this wheel F, and the weight on lever I, in which lever the shaft G has its bearings, will keep the pinion F out of gear until the short arm of this lever is again depressed.

Between the pinion-wheel F and the standard J a double cam-plate, g, is keyed to the shaft G under a horizontal projection, f, of the standard J, against which projection the periphery of the cam g touches when the wheels E F are disengaged from each other. This double cam-plate g allows the shaft G to rise when the elongated teeth e e, of pinion F throws this pinion out of gear with its driving spur-wheel E, and when the machine is moved backward and the wheels B′ and E turned in the direction indicated by the red arrow in Fig. 2 this double cam-plate g will keep the wheel F into gear with wheel E until the wheel F can make a half-revolution, and thus throw the rake up to the position shown in red lines, Fig. 1, out of the way. This double cam-plate g will also assist in keeping the pinion F in gear with the spur-wheel E in going forward after the short arm of lever I has been deprsssed, and when the notches in this plate g pass under the projection f of standard J the pinion F on shaft G will at the same time be thrown out of gear with wheel E by one of the elongated teeth e e.

N N′ represent two parallel rods, which are slotted at their rear ends, and have a transverse bar, P, secured to their front ends, which bar is parallel with the axis of rake-bar D and touches the back of each tooth a as far as it extends. The front ends of these rods are hung from the arms L and P′ by rods i i, which keep the bar P in a horizontal position. The rear ends of rods N N′ are pivoted, one to a stud, j, projecting from bracket H, and other to an arm, k, projecting from a collar, k′, which is fixed to the axle-tree A outside of the wheel B′. The rods N N′ incline from their upper ends toward the rake-teeth, as shown in Fig. 2, and the horizontal bar P serves as a back brace for the teeth a when these teeth are in a working position but when the teeth a are raised, as shown in Fig. 2 of the drawings in red lines the bar P is raised to the position also shown in red lines, Fig. 2. The bar P may extend the full length of the rake, if desired; but as only one-half of the rake is used in cocking, the bar P may extend only over one-half of the rake-teeth. For ordinary raking this brace attachment may be removed by detaching rods i i from arms L and P′, and again attached for cocking the hay in cocks.

The operation of the entire machine is as follows: The driver's seat should be arranged in such a position that he can operate the lever I with one foot while he manages the horse with his hands. Let is be supposed that the machine is being moved forward and the wheels B B′ turning in the direction indicated by the black arrows in Figs. 1 and 2 of the drawings. The driver depresses the short arm of lever I with his foot, and this brings the pinion-wheel F down on the spur-wheel E and engages these wheels. If the rake-teeth should be in the position shown in red lines, Fig. 2, the pinion-wheel will be rotated one-half turn, which is sufficient to move the rake-teeth down to the working position shown in black lines in Fig. 2 of the drawings, when one long tooth e will strike the wheel E and throw the wheels E F out of gear. The raking now proceeds until the rake has gathered a sufficient quantity of hay, when the driver again depresses the short arm of lever I, and thus engages the pinion-wheel F with spur-wheel E. This pinion F now makes another half-turn and raises the rake up out of the way, when the opposite long tooth e will strike the wheel E and again disengage the two wheels E F, leaving the rake this time in the position shown in red lines, Fig. 1. Whenever the long teeth e e throw their pinion F out of gear with wheel E, the notches in cam-plate g catch against the projection f and prevent the shaft G from being turned backward in consequence of the pressure of grass against the rake, then, when the shaft G is depressed by a touch of the foot upon the short arm of lever I, the cam-plate g is released from the projection f aforesaid. When the wheels E and F are not engaged with each other, the rake will remain in the position in which these wheels left it when they were disengaged, whether the rake be in a working position or in an elevated or tilted position. The downward action of the teeth of wheel E upon the teeth of wheel F may keep the two wheels engaged; but for a better security the cam g is used, which will keep these wheels engaged as long as it is desired—viz., until the wheel F makes a half-revolution, as before described.

In backing the machine, the rake must be thrown up from the ground, and if the rake is in a working position, and it is desired to back the machine, the wheel F is depressed, as before described, until it is in gear with the wheel E, then the backward rotation of wheel E will raise the rake to the position shown in red lines, when the wheels E F will be thrown out of gear, as before, leaving the rake in this position.

The pitman K, which connects the crank-arm d with arm L, has a nut, n, on one end, into which the end of pitman K screws, as shown in Fig. 1 of the drawings. By means of this nut the pitman may be extended or contracted in length, and thus the vibrating movement of the rake may be increased or diminished. Instead of a nut at one end of the pitman, a nut having a right-and-left screw cut in it may be used; or any other suitable means may be used for lengthening or shortening the pitman K, so as to increase or diminish the length of vibration of the rake.

The arms N N', carrying the back brace, P, being connected to the vibrating arms L and P' on the rake-bar D, and pivoted, as above described, to the axle-tree A, this back brace will rise and fall with the rake, and when the rake is in a working position the brace-bar will support the rake-teeth, and keep them down to the work of raking the rows of grass up in heaps or cocks.

Having thus described my invention, what I claim as new, and desire to secure by Letters Patent, is—

1. Combining with the driving-gear E on the carriage-wheel B the pinion spur-wheel F, keyed to a rock-shaft, G, having one of its end bearings in the short arm of loaded lever I, and operating as herein set forth.

2. In combination with the pinion F and the loaded-lever I, having its bearing in standard J, the cam-plate $g$ and catch projection $f$ and the long teeth $e\ e$ on spur-wheel F, all arranged and combined as herein set forth.

3. Connecting the rake-head D to the rock-shaft G, operated, as herein set forth, by an extension pitman-rod, K, crank-arm $d$, and arm L, substantially as herein set forth.

4. Bracing or sustaining a spring-tooth rake by means of a back brace, constructed and applied to the rake substantially as herein set forth.

J. C. STODDARD.

Witnesses:
P. EMORY ALDRICH,
D. W. HASKINS.